(12) United States Patent
Interian, III et al.

(10) Patent No.: US 8,824,136 B1
(45) Date of Patent: Sep. 2, 2014

(54) TABLET PC COVER STAND WITH INTEGRATED INPUT DEVICE AND BIOMETRIC READER

(76) Inventors: Alberto Interian, III, Miami, FL (US); Isaac S. Daniel, Miramar, FL (US)

( * ) Notice: Subject to any disclaimer, the term of this patent is extended or adjusted under 35 U.S.C. 154(b) by 254 days.

(21) Appl. No.: 13/412,498

(22) Filed: Mar. 5, 2012

Related U.S. Application Data

(60) Provisional application No. 61/449,596, filed on Mar. 4, 2011.

(51) Int. Cl.
*G06F 1/16* (2006.01)
*G06F 3/038* (2013.01)
*G05G 9/08* (2006.01)

(52) U.S. Cl.
CPC .............. G06F 1/1632 (2013.01); G06F 3/038 (2013.01); G05G 9/08 (2013.01)
USPC ....................... 361/679.41; 345/168; D14/251

(58) Field of Classification Search
USPC .................. 361/679.41, 679.4; 345/156, 168; D14/250, 251
See application file for complete search history.

(56) References Cited

U.S. PATENT DOCUMENTS

| | | | | | |
|---|---|---|---|---|---|
| 4,259,568 | A | * | 3/1981 | Dynesen | 235/1 D |
| 5,648,762 | A | * | 7/1997 | Ichimura et al. | 726/34 |
| 5,822,546 | A | * | 10/1998 | George | 710/303 |
| 6,108,200 | A | * | 8/2000 | Fullerton | 361/679.12 |
| 6,154,759 | A | * | 11/2000 | Chou | 708/110 |
| 6,490,154 | B2 | * | 12/2002 | Thompson | 361/679.41 |
| 6,496,365 | B2 | * | 12/2002 | Tsai | 361/679.4 |
| 6,507,336 | B1 | * | 1/2003 | Lunsford | 345/168 |
| 6,538,642 | B2 | * | 3/2003 | Tsai | 345/168 |
| 6,781,522 | B2 | * | 8/2004 | Sleva et al. | 340/870.1 |
| 6,999,008 | B2 | * | 2/2006 | Wang et al. | 341/22 |
| 7,775,356 | B2 | * | 8/2010 | Palmer | 206/320 |
| 7,778,023 | B1 | * | 8/2010 | Mohoney | 361/679.41 |
| 7,819,247 | B2 | * | 10/2010 | Gonzalez | 206/320 |
| 8,077,453 | B2 | * | 12/2011 | Swan et al. | 361/679.41 |
| 8,080,975 | B2 | * | 12/2011 | Bessa et al. | 320/114 |
| 8,143,982 | B1 | * | 3/2012 | Lauder et al. | 335/219 |
| D660,833 | S | * | 5/2012 | Bau | D14/250 |
| 8,201,687 | B2 | * | 6/2012 | Zeliff et al. | 206/320 |
| 8,253,518 | B2 | * | 8/2012 | Lauder et al. | 335/219 |
| 8,264,310 | B2 | * | 9/2012 | Lauder et al. | 335/219 |
| D671,114 | S | * | 11/2012 | Akana et al. | D14/341 |
| 8,467,186 | B2 | * | 6/2013 | Zeliff et al. | 361/679.56 |
| 8,567,578 | B2 | * | 10/2013 | Cuong et al. | 190/107 |
| 2003/0095380 | A1 | * | 5/2003 | Chen et al. | 361/686 |
| 2003/0201970 | A1 | * | 10/2003 | Liu | 345/156 |
| 2008/0251338 | A1 | * | 10/2008 | Golden et al. | 190/100 |
| 2010/0078343 | A1 | * | 4/2010 | Hoellwarth et al. | 206/320 |
| 2012/0068919 | A1 | * | 3/2012 | Lauder et al. | 345/156 |
| 2012/0146466 | A1 | * | 6/2012 | Lu et al. | 312/223.1 |

* cited by examiner

*Primary Examiner* — Lisa Lea Edmonds
(74) *Attorney, Agent, or Firm* — Carol N. Green, Esq.

(57) ABSTRACT

A device comprising at least one cover, wherein the at least one cover is operative to be formed into a stand for at least one computing device at least one computer peripheral device integrated with the at least one cover, and at least one biometric reader integrated with the at least one cover, wherein the at least one biometric reader is operative to be used to log into the at least one computing device.

28 Claims, 3 Drawing Sheets

TABLET PC COVER STAND WITH INTEGRATED INPUT DEVICE AND BIOMETRIC READER

PRIORITY CLAIM

The present application is a non-provisional patent application based on U.S. provisional patent application Ser. No. 61/449,596, titled "Computing Device Cover with Integrated Computer peripheral Device," filed on Mar. 4, 2011, by Alberto Interian III, et al, whose priority is claimed, and which is hereby incorporated by reference as if fully stated herein.

FIELD

The present disclosure relates generally to electronic systems, apparatuses, and methods, and more particularly, to systems, methods, and various other disclosures related to electronics and electronics covers.

BACKGROUND

Mobile computing devices are on the rise, and a platform which is gaining popularity is the Tablet PC. Many tablet PCs exist on the market, such as Apple's iPad, and the Motorola Xoom. Accordingly there is a secondary market for accessories for such tablet PCs that comprise of covers, such as Apple's Smart Cover™, cases, headphones, peripheral devices, and the like.

One downfall of some tablet PCs is that they have no integrated peripheral devices, so users are forced to carry individual accessory peripherals, such as covers, keyboard, speakers, and the like, and other accessories such as covers along with them, thus reducing the mobility of the tablet PC.

Another issue with current peripherals is the need to carry an additional power cable to power the peripherals. This ads bulk and complexity to using the peripherals with a tablet PC.

Furthermore, since tablet PCs are taken to public places, such as restaurants, libraries, airplanes, and the like, they are more likely to be lost.

SUMMARY

The various embodiments of systems and methods described herein result from the realization that a tablet PC may be made more mobile and convenient by providing a cover/case with an integrated computer peripheral device.

Accordingly, the various embodiments and disclosures described herein solve the limitations of the prior art in a new and novel manner.

DETAILED DESCRIPTION OF PREFERRED EMBODIMENTS

Figure 1A:
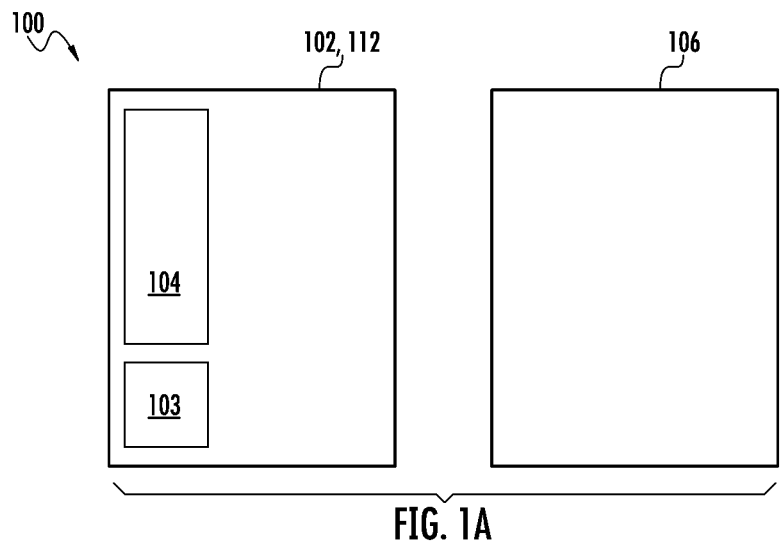
FIGS. 1A-1D show a device in accordance with various embodiments.

FIG. 1A shows a device 100, in accordance with one embodiment, wherein device 100 comprises at least one cover 102, wherein at least one cover 102 may be operative to be formed into a stand 112 for at least one computing device 106, at least one computer peripheral device 104 integrated with at least one cover 102, and at least one biometric reader 103, wherein biometric reader 103 may be operative to be used to log into at least one computing device 106.

Cover 102 may be any type of cover, and may be made of any type of material, including, but not limited to, cloth, plastic, leather polyurethane, latex, rubber, microfiber, and the like.

In some embodiments, the at least one computer peripheral device 104 comprises at least one of an input device, an output device, or an input/output device. The at least one output device may comprise at least one display device, at least one projector, at least one printer, at least one speaker, at least one display port, or at least one audio port. The least one input device may comprise at least one keyboard, at least one mouse, at least one touch screen, at least one touchpad, at least one gesture control system, at least one eye tracking system, at least one scanner, at least one camera, at least one biometric reader, such as, but not limited to a finger print reader, an iris scanner, and the like, or at least one microphone. The at least one input/output device may comprise a means for attaching a storage device, a storage device, a means for reading a storage device, such as a media card reader, and data communications ports.

Figure 1B:
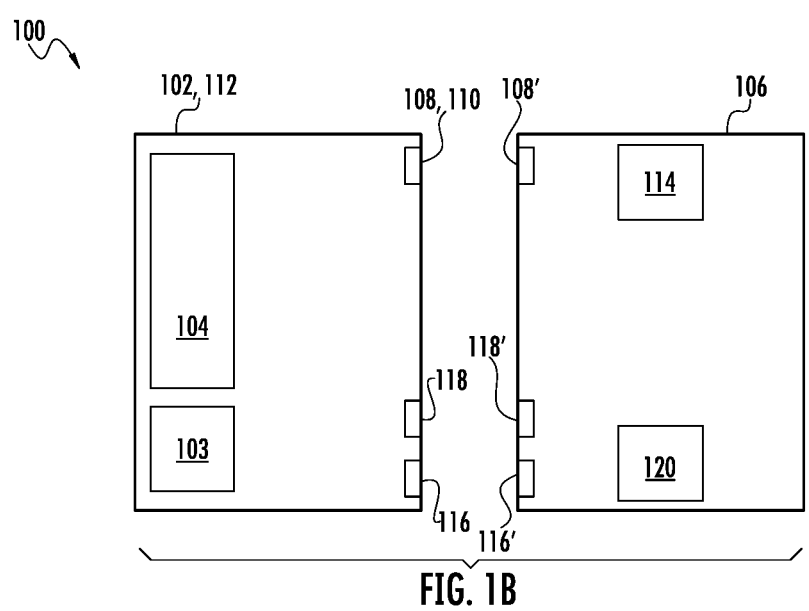

In some embodiments, device 100 may further comprise at least one means 108 for attaching the cover 102 to at least one computing device 106 (as shown in FIG. 1B). In some embodiments, means 108 may comprise at least one magnet, at least one hook and loop, at least one button or tab, at least one suction cup, at least one surface capable of exerting static cling, at least one sleeve, and the like. In some embodiments means 108 may be operative to interface with at least one attachment mechanism (not shown) on computing device 106. The attachment mechanism may be a similar means 108, such as magnets, hook and loop, buttons, suction cup, and the like. In some embodiments, at least one means 108 for attaching cover 102 to computing device 106 comprises at least one first means for attaching cover 102 to computing device 106, wherein said first means is disposed in or attached to cover 102, and at least one second means for attaching cover 102 to computing device 106, wherein said second means is disposed in or attached to computing device 106. In some embodiments both first and second attachment means may be positioned in corresponding locations on cover 102 and computing device 106. In some embodiments, first means and second means may comprise a plurality of attachment means, such as, but not limited to magnets, or other attachment means as described herein.

In one embodiment, at least one computing device 106 may be any type of computing device, such as, but not limited to, a PC, a laptop, a smartphone, a desktop PC, and a tablet PC, such as, but not limited to Apple, Inc.'s iPad®.

In some embodiments, at least one first means for attaching cover 102 to computing device 106 and the at least one second means for attaching cover 102 to computing device 106 may be operative to interface with each other and self align cover 102 with computing device 106 and/or computing device's screen 114, when cover 102 is attached to computing device 106.

Figure 1C:
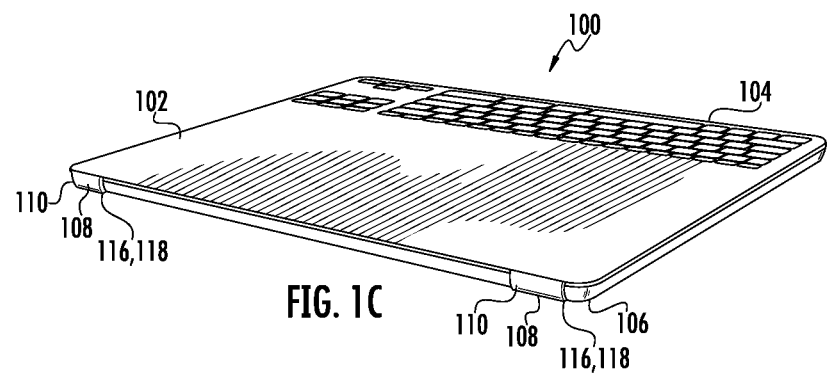
Figure 1D:
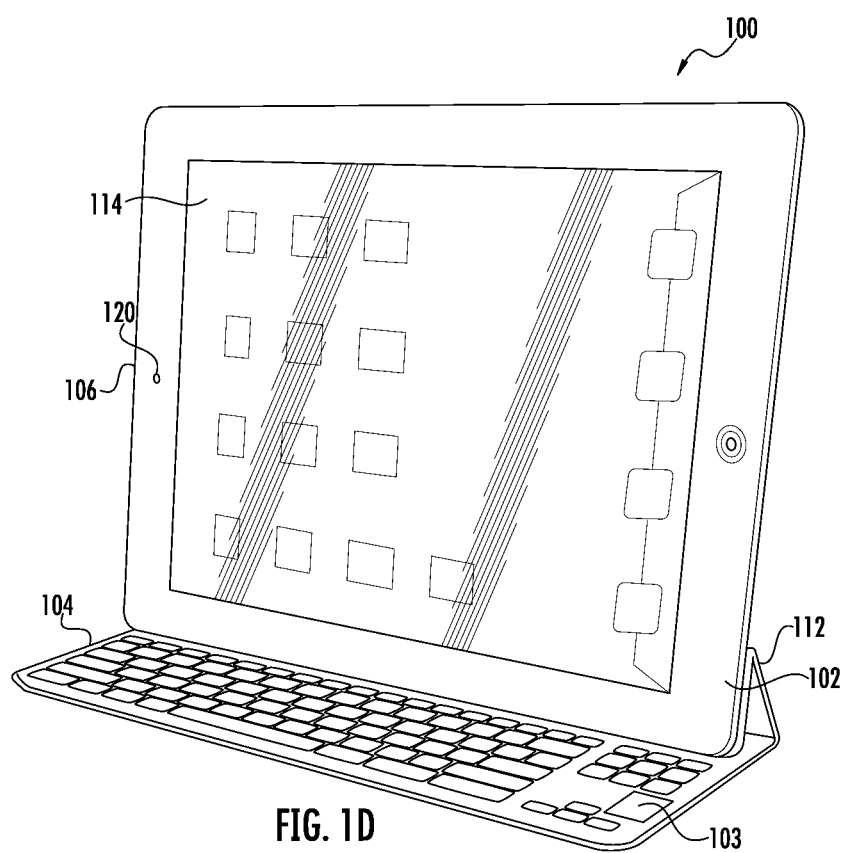

In a further embodiment means 108 may comprise at least one hinge 110, which may allow cover 102 to remain partially attached to computing device 106, and may further allow cover 102 to be formed into a stand 112 (as shown in FIG. 1C). In yet another embodiment, at least one computer peripheral device 104 may positioned such that it is accessible while cover 102 is formed into a stand 112 (as shown in FIG. 1D).

In some embodiments, at least one cover 102 may comprise a screen cover.

In one embodiment, at least one computer peripheral device 104 may comprise at least one a wireless computer peripheral device. In another embodiment, at least one computer peripheral device 104 may comprise at least one wired or non-wireless computer peripheral device.

In some embodiments, device 100 may further comprise at least one means for powering computer peripheral device 104. The means for powering computer peripheral device may be partially or wholly integrated with or connected to cover 102. The means for powering computer peripheral device 104 may comprise at least one means 116 for receiving power from an external power source, such as an external power supply, a PC, a laptop, a tablet PC, and the like. Accordingly, means 116 for receiving power from an external power source may include a port, power pins or terminals, power contacts, or inductive power transmission means.

In some embodiments, means 116 for receiving power from an external power source is operative to interface with at least one means for delivering power, which may be integrated with or connected to computing device 106. Means 116 for receiving power may be operative to interface with the at least one means for delivering power when cover 102 is attached to computing device 106. Such an arrangement may allow computing device 106 to supply power to device 100 and all of its electronic components, such as computer peripheral device 104, while cover 102 is attached to computing device 106. The power may be supplied directly to computer peripheral device 104, or indirectly via a battery integrated with or connected to cover 102.

In another embodiment, at least one means for powering computer peripheral device 104 may comprise an internal power source, such as at least one battery, or at least one solar power supply, or any combination thereof. The at least one solar power supply may also work to charge the battery of both computer peripheral device 104 and/or computing device 106. The at least one solar power supply may comprise solar cells positioned throughout cover 102.

In yet another embodiment, at least one means for receiving power 116 may comprise at least one means for charging the at least one means for powering computer peripheral device 104. In another embodiment at least one means for receiving power 116 or at least one means for powering computer peripheral device 104 may be integrated into at least one means 108 for attaching cover 102 to computing device 106.

In one embodiments, device 100 further comprises at least one means for communicating with a computing device 106, wherein said means for communicating with computing device 106 is integrated with or connected to cover 102. The term "communicate," as used throughout the present disclosure, refers to an electronic communication or connection, which may be used to communicate electronic information or instructions. Accordingly, at least one means for communicating with computing device 106 may be in electronic communication with computer peripheral device 104. The at least one means for communicating with computing device 106 may comprise at least one wireless communications module, such as, but not limited to a Bluetooth® module, WiFi® module, ZigBee® module, and the like. In some embodiments, at least one means for communicating with computing device 106 and computer peripheral device 104 may share a common means for receiving power or power source, such as those various power receiving means and power sources described throughout the present disclosure.

In an alternate embodiment, at least one means for communicating with computing device 106 may comprise at least one non-wireless means for communicating with computing device 106, such as a data port, data pins, data terminals, or data transferring contacts. In some embodiments, device 100 may comprise at least one means for communicating with computing device 106, wherein said means for communicating with computing device 106 may be integrated into at least one means 108 for attaching cover 102 to computing device 106.

Accordingly, in some embodiments, at least one means for communicating with computing device 106 may be operative to communicate with computing device 106 when cover 102 is attached to computing device 106.

In a further embodiment, at least one means for communicating with computing device 106 may comprise at least one communications interface 118 on cover 102 that links with at least one second communications interface on computing device 106 when cover 102 is attached to computing device 106. Such a communications interface may be a hardware communications interface, such as those described above, and/or a software communications interface, which may include hardware communications software, firmware, middleware, proxies, and the like.

In yet a further embodiment, at least one first communications interface 118 on cover 102 and at least one second communications interface on computing device 106 may be operative to deliver power to device 100, and its components, including computer peripheral device 104, from computing device 106 when cover 102 is attached to computing device 106.

In another embodiment, device 100 comprises at least one means for communicating with computing device 106, wherein means for communicating with computing device 106 is operative to communicate information between computer peripheral device 104 and computing device 106. In some embodiment, said communications may be encrypted.

In some embodiments, device 100, or computing device 106, further comprises at least one means for powering down device 100 or computing device 106, or placing device 10 or computing device 106 into power saving mode, when cover 102 is covering computing device 106's screen 114. In some embodiments, means for powering off or power saving device 100 or computing device 106 may comprise at least one sensor 120, which can sense when sensor has been covered by a surface of either cover 102 or computing device 106. At least one sensor 120 may be any type of sensor, including, but not limited to, a light sensor, a camera, a thermal sensor, a proximity sensor, and electrical sensor, a capacitive sensor, a magnetic sensor, a piezoelectric sensor, a static electricity sensor, and the like. In some embodiments, at least one sensor 120 may be positioned on cover 102 and/or on computing device 106.

In some embodiments, device 100, or computing device 106, further comprises at least one means for powering on device 100 or computing device 106 when cover 102 is no longer covering computing device 106's screen 114. In some embodiments, means for powering on device 100 or computing device 106 may comprise at least one sensor 120, which can sense when sensor is no longer being covered by a surface of either cover 102 or computing device 106. At least one sensor 120 may be any type of sensor, including, but not limited to, a light sensor, a camera, a thermal sensor, a proximity sensor, and electrical sensor, a capacitive sensor, a magnetic sensor, a piezoelectric sensor, a static electricity sensor, and the like. In some embodiments, at least one sensor 120 may be positioned on cover 102 and/or on computing device 106. In some embodiments, means for power off or powering down may comprise means for powering on, and vice-versa.

In an alternate embodiment, device 100 comprises at least one cover 102, wherein the at least one cover 102 is operative to be formed into a stand 112; at least one computer peripheral device 104 integrated with the at least one cover 102, wherein the at least one computer peripheral device 104 is positioned such that it is accessible while the at least one cover 102 is formed into a stand 112; at least one means 108 for attaching the cover 102 to a tablet PC 106, wherein said means 108 for attaching the cover 102 to a tablet PC 106 is operative to self align the cover 102 and the tablet PC 106; at least one means 116 for powering the computer peripheral device 104; and at least one means for communicating with the tablet PC 106.

In one embodiment, the term "log-in" may refer to the process of gaining access to the functionality of a tablet PC 106. Tablet PC 106 may be loaded with computer executable instructions that may be operative to request a biometric identifier from a user in order to allow that user to gain access or use tablet PC, whereby the user may use biometric reader 103 to provide the biometric identifier, which may include a fingerprint. The computer executable instructions may then be operative to compare the user-provided identifier with an authorized identifier, and if the identifiers match allow the user to access or use tablet PC 106.

In some embodiments the at least one means for powering the computer peripheral device is integrated with the least one means for attaching the cover to a tablet PC. In other embodiments, the at least one means for communicating with the tablet PC is integrated with the least one means for attaching the cover to a tablet PC.

Figure 2:
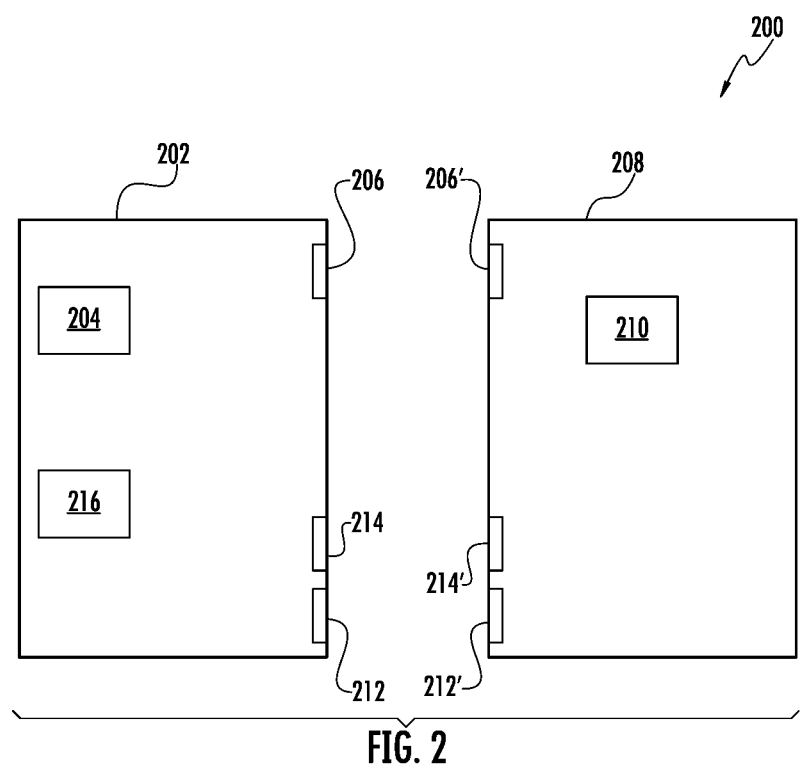
FIG. 2 shows a device in accordance with one embodiment.

Referring now to FIG. 2, a device 200 is shown in accordance with one embodiment, wherein device 200 may comprise at least one cover 202, wherein the at least one cover 202 is operative to be formed into a stand, at least one computer peripheral device 204 integrated with the at least one cover 202, wherein the at least one computer peripheral device 204 is positioned such that it is accessible while the at least one cover 202 is formed into a stand, at least one means 206, 206' for attaching the cover to a tablet PC 208, wherein said means 206 for attaching the cover 202 to a tablet PC 208 is operative to self align the cover 202 over a screen 210 of the tablet PC 208, at least one means 212, 212' for powering the computer peripheral device 204, at least one means 214, 214' for communicating with the tablet PC 208, and at least one biometric reader 216 integrated with the at least one cover 202, wherein the at least one biometric reader 216 is operative to be used to log into the at least one tablet PC 208.

In some embodiments, the at least one means 212, 212' for powering the computer peripheral 204 device may be integrated with the least one means 206, 206' for attaching the cover 202 to a tablet PC 208.

In some embodiments, wherein the at least one means 214, 214' for communicating with the tablet PC 208 may be integrated with the least one means 206, 206' for attaching the cover 202 to a tablet PC 208.

In some embodiments, cover 202 may be any type of cover, including those described above with reference to FIGS. 1A through 1D.

In some embodiments, computer peripheral device 204 may be any type of computer peripheral device, including those described above with reference to FIGS. 1A through 1D.

In some embodiments, cover 202 may be any type of cover, including those described above with reference to FIGS. 1A through 1D.

In some embodiments, biometric reader 216 may be any type of biometric reader, including those described above with reference to FIGS. 1A through 1D.

Means 206 for attaching cover 202 to tablet PC 208 may be any type of means, such as those described above with reference to FIGS. 1A through 1D.

Tablet PC 208 may be any type of tablet PC, such as those described above with reference to FIGS. 1A through 1D.

Means 212 for powering computer peripheral device 204 may be any type of means, such as those described above with reference to FIGS. 1A through 1D.

Means 214 for communicating with tablet PC 208 may be any type of means, such as those described above with reference to FIGS. 1A through 1D.

Screen 210 may be any type of screen, such as those described above with reference to FIGS. 1A through 1D.

A computer readable medium is provided, wherein said computer readable medium contains containing computer executable instructions operative to use at least one processor to perform any or all of the following: determine when a cover containing a computer peripheral device is covering a computing device's screen; place the computer peripheral device into power down or power save mode when the cover is covering the computing device's screen; determine when the cover has been removed from the computing device's screen; and power on the computer peripheral device when the cover has been removed from the computing device's screen. The term "computer readable medium" as used herein, may refer to any type of computer readable medium, such as, but not limited to, computer memory, a compact disc, DVD, Blu Ray, flash memory, hard drive, or other computer readable mediums.

A computer readable medium is provided, which contains computer executable instructions operative to use at least one processor to perform any or all of the following: Determine when a cover containing a computer peripheral device is covering a computing device's screen; Cease electronic communications between the computer peripheral and the computing device when the cover is covering the computing device's screen; Determine when the cover has been removed from the computing device's screen; and Commence electronic communications between the computer peripheral and the computing device when the cover has been removed from the computing device's screen.

A computer readable medium containing computer executable instructions operative to use at least one processor to perform any or all of the following: Determine when a cover containing a computer peripheral device is attached to a computing device; and Commence delivering power to the computer peripheral device from the computing device when the cover is attached to the computing device.

It should be noted that by providing a cover for a computing device, wherein said cover includes at least one, if not more, integrated computer peripheral device(s), which may include a convenient attachment means, such as magnets, communications means and means for powering the computer peripherals, and a form factor that allows the cover to easily be forms into a stand, mobile computing devices will be made more convenient and easy to use. And, by providing a cover which uses its means to attach itself to a computing device to not only attach itself to the computing device, but to also facilitate power delivery and communications between the computing device and the computer peripherals integrated in the cover, mobile computing devices may be made even more convenient and easy to use.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

The invention claimed is:

1. A device comprising:
   a. at least one cover, wherein the at least one cover is operative to be formed into a stand for at least one computing device;
   b. at least one computer peripheral device integrated with the at least one cover;
   c. at least one biometric reader integrated with the at least one cover, wherein the at least one biometric reader is operative to be used to log into the at least one computing device; and
   d. at least one means for powering the computer peripheral device, wherein the at least one means for powering the computer peripheral device comprises at least one means for charging the at least one means for powering the computer peripheral device.

2. The device of claim 1, wherein the at least one computer peripheral device comprises at least one of an input device, an output device, or an input/output device.

3. The device of claim 2, wherein the at least one output device comprises at least one display device, at least one projector, at least one printer, at least one speaker, at least one display port, or at least one audio port.

4. The device of claim 3, wherein the at least one input device comprises at least one keyboard, at least one mouse, at least one touch screen, at least one touchpad, at least one gesture control system, at least one eye tracking system, at least one scanner, at least one camera, at least one biometric reader, or at least one microphone.

5. The device of claim 1, further comprising at least one means for attaching the cover to the at least one computing device.

6. The device of claim 5, wherein the computing device is a type of computing device selected from the group consisting essentially of a tablet PC, a laptop PC, a smartphone, and a desktop PC.

7. The device of claim 5, wherein the means for attaching the cover to a computing device comprises any of the following:
   a. At least one magnet;
   b. At least one hooks and loops;
   c. At least one button or tab;
   d. At least one suction cup;
   e. At least one surface capable of exerting static cling; and
   f. At least one sleeve to accept the computing device.

8. The device of claim 5, wherein the at least one means for attaching the cover to a computing device is operative to interface with at least one attachment mechanism on the computing device.

9. The device of claim 5, wherein the at least one means for attaching the cover to a computing device comprises at least one first means for attaching the cover to computing device, wherein said first means is disposed in or attached to the cover, and at least one second means for attaching the cover to a computing device, wherein said second means is disposed in or attached to the computing device.

10. The device of claim 9, wherein the at least one first means for attaching the cover to a computing device and the at least one second means for attaching the cover to a computing device are operative to interface with each other and self-align the cover with the computing device or the computing device's screen when the cover is attached to the computing device.

11. The device of claim 1, wherein the at least one cover is operative to cover the at least one computing device's screen.

12. The device of claim 1, wherein the at least one cover comprises at least one screen cover.

13. The device of claim 1, wherein the at least one means for powering the computer peripheral device is integrated with or connected to the cover.

14. The device of claim 1, wherein the at least one means for powering the computer peripheral device comprises at least one means for receiving power from an external power source.

15. The device of claim 14, wherein the external power source is a type of power source selected from the group consisting essentially of:
   a. An external power supply;
   b. A PC;
   c. A laptop; and
   d. A tablet PC.

16. The device of claim 14, wherein the at least one means for receiving power from an external power source is operative to interface with at least one means for delivering power.

17. The device of claim 16, wherein the at least one means for delivering power is integrated with or connected to a computing device.

18. The device of claim 16, wherein the at least one means for receiving power is operative to interface with the at least one means for delivering power when the cover is attached to the computing device.

19. The device of claim 1, further comprising at least one means for communicating with a computing device, wherein said means for communicating with a computing device is integrated with or connected to the cover.

20. The device of claim 19, wherein the at least one means for communicating with a computing device is operative to communicate with the computing device when the cover is attached to the computing device.

21. The device of claim 19, wherein the at least one means for communicating with a computing device comprises at least one communications interface on the cover that links with at least one second communications interface on a computing device when the cover is attached to the computing device.

22. The device of claim 21, wherein the at least one first communications interface on the cover, and the at least one second communications interface on a computing device is operative to deliver power to the device, and its components, from the computing device when the cover is attached to the computing device.

23. The device of claim 1, wherein the at least one computer peripheral device is positioned such that it is accessible while the at least one cover is formed into a stand.

24. A device comprising:
   a. at least one cover, wherein the at least one cover is operative to be formed into a stand;
   b. at least one computer peripheral device integrated with the at least one cover, wherein the at least one computer peripheral device is positioned such that it is accessible while the at least one cover is formed into a stand;
   c. at least one means for attaching the cover to a tablet PC, wherein said means for attaching the cover to a tablet PC is operative to self-align the cover over a screen of the tablet PC;
   d. at least one means for powering the computer peripheral device wherein the at least one means for powering the computer peripheral device comprises at least one means for charging the at least one means for powering the computer peripheral device;

e. at least one means for communicating with the tablet PC; and
f. at least one biometric reader integrated with the at least one cover, wherein the at least one biometric reader is operative to be used to log into the at least one tablet PC.

25. The device of claim 24, wherein the at least one means for powering the computer peripheral device is integrated with the least one means for attaching the cover to a tablet PC.

26. The device of claim 24, wherein the at least one means for communicating with the tablet PC is integrated with the least one means for attaching the cover to a tablet PC.

27. A device comprising:
a. at least one cover, wherein the at least one cover is operative to be formed into a stand for at least one computing device;
b. at least one computer peripheral device integrated with the at least one cover;
c. at least one biometric reader integrated with the at least one cover, wherein the at least one biometric reader is operative to be used to log into the at least one computing device;
d. at least one means for communicating with a computing device, wherein said means for communicating with a computing device is integrated with or connected to the at least one cover, and wherein the at least one means for communicating with a computing device comprises at least one communications interface on the cover that links with at least one second communications interface on a computing device when the cover is attached to the computing device; and
e. wherein the at least one communications interface on the cover, and the at least one second communications interface on a computing device is operative to deliver power to the device, and its components, from the computing device when the cover is attached to the computing device.

28. The device of claim 27, wherein the at least one computer peripheral device comprises at least one of an input device, an output device, or an input/output device.

* * * * *